(12) United States Patent
Boniface

(10) Patent No.: US 10,626,925 B2
(45) Date of Patent: Apr. 21, 2020

(54) GAS TURBINE ENGINE WITH A GEARED TURBOFAN ARRANGEMENT

(71) Applicant: Rolls-Royce Deutschland Ltd & Co KG, Blankenfelde-Mahlow (DE)

(72) Inventor: Dominic Boniface, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 299 days.

(21) Appl. No.: 15/707,471

(22) Filed: Sep. 18, 2017

(65) Prior Publication Data

US 2018/0080504 A1 Mar. 22, 2018

(30) Foreign Application Priority Data

Sep. 20, 2016 (EP) ..................................... 16189697

(51) Int. Cl.
*F16D 9/06* (2006.01)
*F01D 21/04* (2006.01)
(Continued)

(52) U.S. Cl.
CPC ............... *F16D 9/06* (2013.01); *B64D 35/02* (2013.01); *F01D 15/12* (2013.01); *F01D 21/045* (2013.01);
(Continued)

(58) Field of Classification Search
CPC ....... B64D 35/02; F01D 15/12; F01D 21/045; F01D 21/14; F02C 7/36; F02K 3/06;
(Continued)

(56) References Cited

U.S. PATENT DOCUMENTS 3,997,042 A 12/1976 Langham
4,270,408 A 6/1981 Wagner
(Continued)

FOREIGN PATENT DOCUMENTS

DE 102011084360 A1 4/2013
EP 2199568 A2 6/2010
(Continued)

OTHER PUBLICATIONS

European Search Report dated Mar. 30, 2017 for related European Application No. 16189699.8.
(Continued)

*Primary Examiner* — Carl C Staubach
(74) *Attorney, Agent, or Firm* — Shuttleworth & Ingersoll, PLC; Timothy J. Klima

(57) ABSTRACT

A gas turbine engine with a geared turbofan arrangement with a gearbox in a drive shaft assembly driven by a turbine is provided. A driving side of the gearbox being driveably connected with at least one propulsive fan, with at least one mechanical fuse in the drive shaft assembly enabling a controlled disengagement of at least one engine part from the drive shaft assembly in case of a mechanical failure of the gas turbine engine or a part thereof and at least one load stop for bearing a load, in particular an axial or radial load in case of the mechanical failure of the gas turbine or a part thereof. A first mechanical fuse is positioned in a torque carrying shaft or a torque carrying part of a shaft, in particular in a torque bearing coupling between the shaft and the gearbox.

10 Claims, 4 Drawing Sheets

(51) Int. Cl.
*F02K 3/06* (2006.01)
*B64D 35/02* (2006.01)
*F01D 15/12* (2006.01)
*F01D 21/14* (2006.01)
*F02C 7/36* (2006.01)

(52) U.S. Cl.
CPC ............. *F01D 21/14* (2013.01); *F02C 7/36* (2013.01); *F02K 3/06* (2013.01); *F05D 2220/32* (2013.01); *F05D 2220/36* (2013.01); *F05D 2260/30* (2013.01); *F05D 2260/311* (2013.01); *F05D 2260/40* (2013.01); *F05D 2260/40311* (2013.01)

(58) Field of Classification Search
CPC ............. F05D 2220/32; F05D 2220/36; F05D 2260/30; F05D 2260/311; F05D 2260/40; F05D 2260/40311; F16D 9/06
See application file for complete search history.

(56) References Cited

U.S. PATENT DOCUMENTS

| | | | | |
|---|---|---|---|---|
| 4,452,567 | A * | 6/1984 | Treby | F01D 5/026 415/9 |
| 5,533,825 | A | 7/1996 | Stone | |
| 6,428,269 | B1 * | 8/2002 | Boratgis | F01D 21/045 411/2 |
| 7,716,914 | B2 | 5/2010 | Schilling | |
| 7,882,693 | B2 | 2/2011 | Schilling | |
| 8,621,871 | B2 * | 1/2014 | McCune | F01D 21/02 60/204 |
| 9,353,690 | B2 | 5/2016 | Makulec et al. | |
| 2002/0069637 | A1 | 6/2002 | Becquerelle et al. | |
| 2003/0210979 | A1 * | 11/2003 | Doerflein | F01D 21/045 415/1 |
| 2004/0006967 | A1 * | 1/2004 | Clark | F01D 21/04 60/223 |
| 2005/0193715 | A1 * | 9/2005 | Opper | F01D 21/003 60/39.091 |
| 2005/0220384 | A1 * | 10/2005 | Plona | F01D 21/045 384/624 |
| 2007/0084183 | A1 * | 4/2007 | Moniz | F01D 21/04 60/204 |
| 2008/0098717 | A1 | 5/2008 | Orlando et al. | |
| 2008/0120839 | A1 | 5/2008 | Schilling | |
| 2010/0132369 | A1 * | 6/2010 | Durocher | F01D 9/065 60/796 |
| 2013/0199206 | A1 * | 8/2013 | Cigal | F01D 17/06 60/803 |
| 2014/0271135 | A1 | 9/2014 | Sheridan et al. | |
| 2016/0130975 | A1 * | 5/2016 | Chilton | F01D 21/045 415/9 |
| 2016/0160875 | A1 | 6/2016 | Schwarz | |
| 2017/0081973 | A1 | 3/2017 | Swift et al. | |
| 2017/0082065 | A1 | 3/2017 | Swift et al. | |
| 2017/0175753 | A1 * | 6/2017 | Tan-Kim | F04D 29/054 |
| 2018/0080387 | A1 * | 3/2018 | Boniface | B64D 35/02 |

FOREIGN PATENT DOCUMENTS

| | | |
|---|---|---|
| EP | 2360391 A1 | 8/2011 |
| EP | 2415991 A2 | 2/2012 |
| EP | 2535528 A2 | 12/2012 |
| EP | 2884056 A1 | 6/2015 |
| EP | 2998557 A1 | 3/2016 |
| EP | 3121469 A1 | 1/2017 |
| FR | 3022890 A1 | 1/2016 |
| GB | 2487551 A | 8/2012 |

OTHER PUBLICATIONS

European Search Report dated Mar. 24, 2017 for related European Application No. 16189712.9.
European Search Report dated Mar. 16, 2017 for related European Application No. 16189708.7.
European Search Report dated Mar. 23, 2017 from counterpart EP App No. 16189697.2.
Dominic Boniface—U.S. Appl. No. 15/647,953, filed Jul. 12, 2017.
Gideon Venter—U.S. Appl. No. 15/646,775, filed Jul. 11, 2017.
Dominic Boniface—U.S. Appl. No. 15/708,716, filed Sep. 19, 2017.

* cited by examiner

GAS TURBINE ENGINE WITH A GEARED TURBOFAN ARRANGEMENT

REFERENCE TO RELATED APPLICATION

This application claims priority to European Patent Application No. 16 189 697.2 filed on Sep. 20, 2016, the entirety of which is incorporated by reference herein.

BACKGROUND

The invention relates to a gas turbine engine with a geared turbofan arrangement.

Gas turbine engines with geared turbofan arrangements, in particular aircraft engines, require some means to mitigate damages that might occur after a failure. A failure might involve the rotation prevention of at least one part of the drive train. Such a failure might be e.g. a shaft breaking, a rotor-casing contact or a bearing seizure.

SUMMARY

Therefore, gas turbine engines with an improved resilience are required.

This is addressed by a gas turbine engine with a geared turbofan arrangement with a gearbox in a drive shaft assembly driven by a turbine, a driving side (i.e. the output side) of the gearbox being driveably connected with at least one propulsive fan, with at least one mechanical fuse in the drive shaft assembly enabling a controlled disengagement of at least one engine part from the drive shaft assembly in case of a mechanical failure of the gas turbine engine or a part thereof and at least one load stop for bearing a load, in particular, a radial or axial load in case of the mechanical failure of the gas turbine or a part thereof.

A first mechanical fuse is positioned in a torque carrying shaft or a torque carrying part of a shaft, in particular, a torque bearing coupling between the shaft and the gearbox. The shaft is driveably connected to the gearbox and has a part which carries torque (e.g. a fan shaft) and a part (e.g. a thrust shaft) which essentially only carries bending moments and axial loads. In particular, the first mechanical fuse can comprise a spline joint. The first mechanical fuse will e.g. isolate the gearbox from mechanical damage in case of the mechanical failure.

In an embodiment of the gas turbine engine, the at least one mechanical fuse comprises a defined thinning of a load bearing material, a structuring of a load bearing material and/or a structure with a defined deformable zone. These features of the mechanical fuse alone or in combination allow a defined breakage of the material, forming the mechanical fuse. The strength of the material at the mechanical fuse can be designed so that a load (torque and/or force) beyond a certain threshold will cause a defined breaking at the mechanical fuse location. The mechanical fuse can also comprise a shape of a material which can absorb energy by deforming the mechanical fuse in a defined way.

In a further embodiment, a second mechanical fuse is positioned in a non-torque carrying shaft or a non-torque carrying part of a shaft, in particular the thrust shaft. This mechanical fuse is torque activated.

In another embodiment, a third mechanical fuse is positioned in a front bearing cone of the gas turbine engine, in particular, axially behind a first bearing. The first bearing can e.g. connect the fan shaft with the front bearing cone.

The mechanical fuses are positioned in the gas turbine engine, i.e. the mechanical fuses are coupling two parts or they are embedded with one of the parts. After a certain predetermined threshold value for a force and/or torque is exceeded, the mechanical fuse breaks in the defined way.

In one embodiment, at least one load stop (e.g. a dry bearing) is positioned between a torque carrying part of a shaft, in particular, the torque bearing coupling of the gearbox to the fan shaft to engage a moving part of the gas turbine engine after the mechanical failure. In particular, at least one load stop is designed for retaining the at least one propulsive fan in the gas turbine engine and/or for directing loads away from the gearbox.

To keep the thrust shaft in a secure and rotatable position in one embodiment the thrust shaft comprises and/or is contacting guiding means ("bumpers") to allow rotation under thrust shaft deflection occurring under a failure mode.

Furthermore, it is possible that an embodiment uses detection means for an overspeeding of a shaft, in particular, the thrust shaft. The detection means are usually present in a gas turbine engine for other purposes. The signal regarding an overspeeding can be used to detect a shaft break. Another embodiment comprises a reference shaft for the detection of a shaft break. The rotational speed of the reference shaft is measured. If there is a difference in the rotational speed of a driving shaft, this is an indication that a breakage has occurred.

BRIEF DESCRIPTION OF THE DRAWINGS

Embodiments of the invention are shown in the figures.

DETAILED DESCRIPTION

Figure 1:
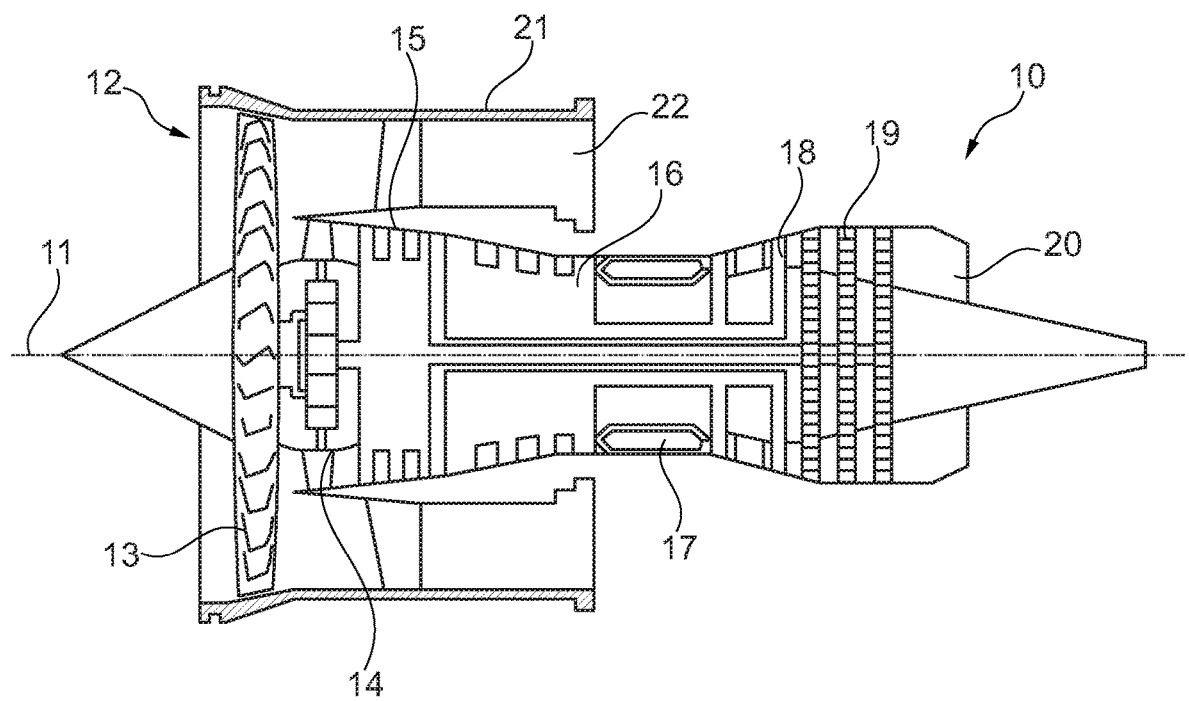
FIG. 1 shows a schematic drawing of a gas turbine engine according to the prior art.

With reference to FIG. 1, a gas turbine engine is generally indicated at 10, having a principal and rotational axis 11. The engine 10 comprises, in axial flow series, an air intake 12, a propulsive fan 13 (could be more than one stage), a gearbox 14, an intermediate pressure compressor 15, a high-pressure compressor 16, combustion equipment 17, a high-pressure turbine 18, an intermediate-pressure turbine 19 and an exhaust nozzle 20. A fan casing 21 generally surrounds the engine 10 and defines the intake 12.

The gas turbine engine 10 works in the conventional manner so that air entering the intake 12 is accelerated by the fan 13 to produce two air flows: a first air flow into the intermediate pressure compressor 15 and a second air flow which passes through a bypass duct 22 to provide propulsive thrust. The intermediate pressure compressor 15 compresses the air flow directed into it before delivering that air to the high pressure compressor 16 where further compression takes place.

The compressed air exhausted from the high-pressure compressor 16 is directed into the combustion equipment 17 where it is mixed with fuel and the mixture combusted. The resultant hot combustion products then expand through, and thereby drive the high pressure turbine 18 and intermediate pressure turbine 19 before being exhausted through the nozzle 20 to provide additional propulsive thrust. The high pressure turbine 18 and the intermediate pressure turbine 19, respectively, drive the high pressure compressor 16 and the intermediate pressure compressor 15, each by suitable interconnecting shaft assembly.

An intermediate pressure shaft 109 also drives the propulsive fan 13 via the gearbox 14. The gearbox 14 is a reduction gearbox in that it gears down the rate of rotation of the fan 13 by comparison with the intermediate pressure compressor 15 and intermediate pressure turbine 19.

The gearbox 14 is an epicyclic planetary gearbox having a static ring gear, rotating and orbiting planet gears supported by a planet carrier and a rotating sun gear.

The embodiment shown in FIG. 1 has a specific shaft arrangement which is understood not to be limiting. The embodiments described in the following can also work with a 2- or 3-shaft arrangement.

As shown in FIG. 1, geared turbofan engines 10 are known in the art. With increasing power ratings and/or increasing diameters of the propulsive fans 13, the loads on the gas turbine engines 10 are increasing. Therefore, it seems advisable to introduce measures to counteract potential failure modes or extreme events such as e.g. a fan blade off, a core blade off, a bird strike, a mainline bearing seizure or a gearbox 14 seizure. Some of such failure modes will be described below.

In the following, reference is made to FIGS. 2 and 3 which show different embodiments of gas turbines 10 using mechanical fuses 31, 32, 33 (see FIG. 2) and load stops 41, 42 (see FIG. 3) to increase the resilience of the gas turbine 10.

The counter measures to the failures comprise at least one mechanical fuse 31, 32, 33 enabling a controlled disengagement of at least one part of the gas turbine engine 10, in particular from a drive shaft assembly. The drive shaft assembly comprises e.g. the shafts leading from the turbines 18, 19 to the compressors 15, 16 (see FIG. 1), the gearbox 14 and the propulsive fan 13. Further details of the drive shaft assembly in the embodiments will be shown below.

Figure 2:
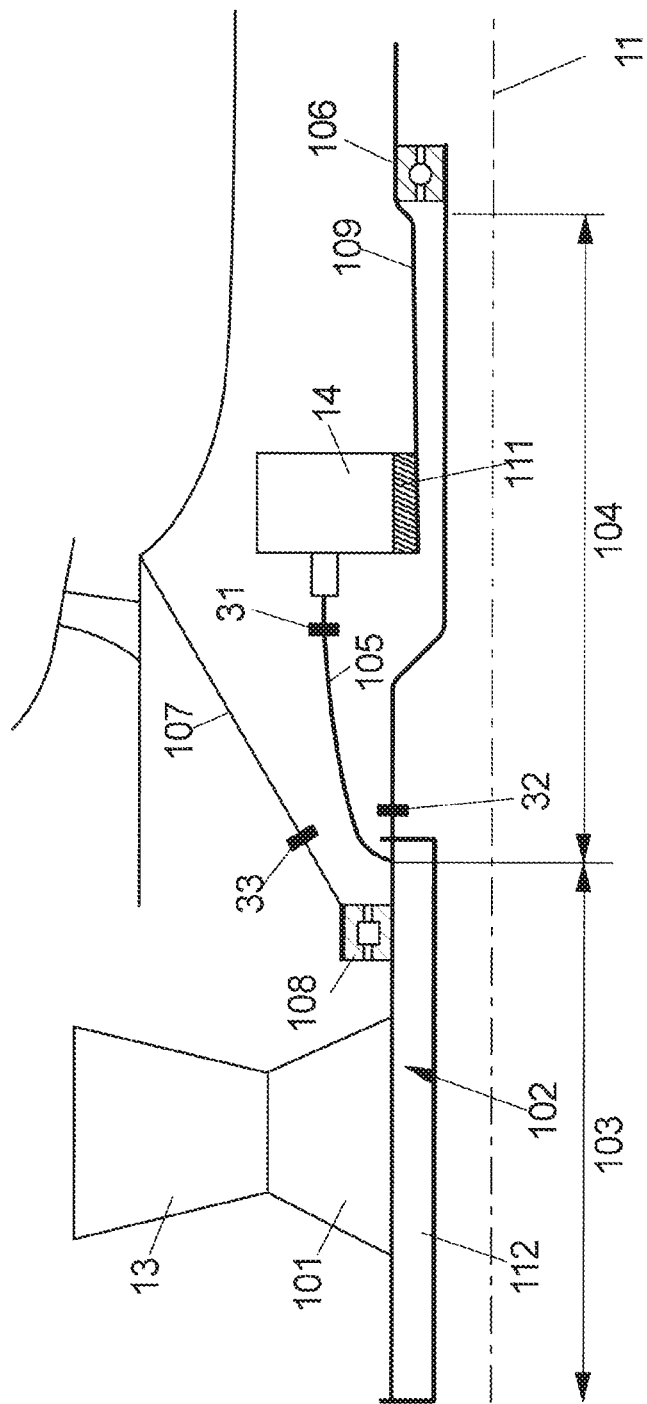
FIG. 2 shows a cross-sectional view of a first embodiment of a gas turbine engine.
Figure 3:
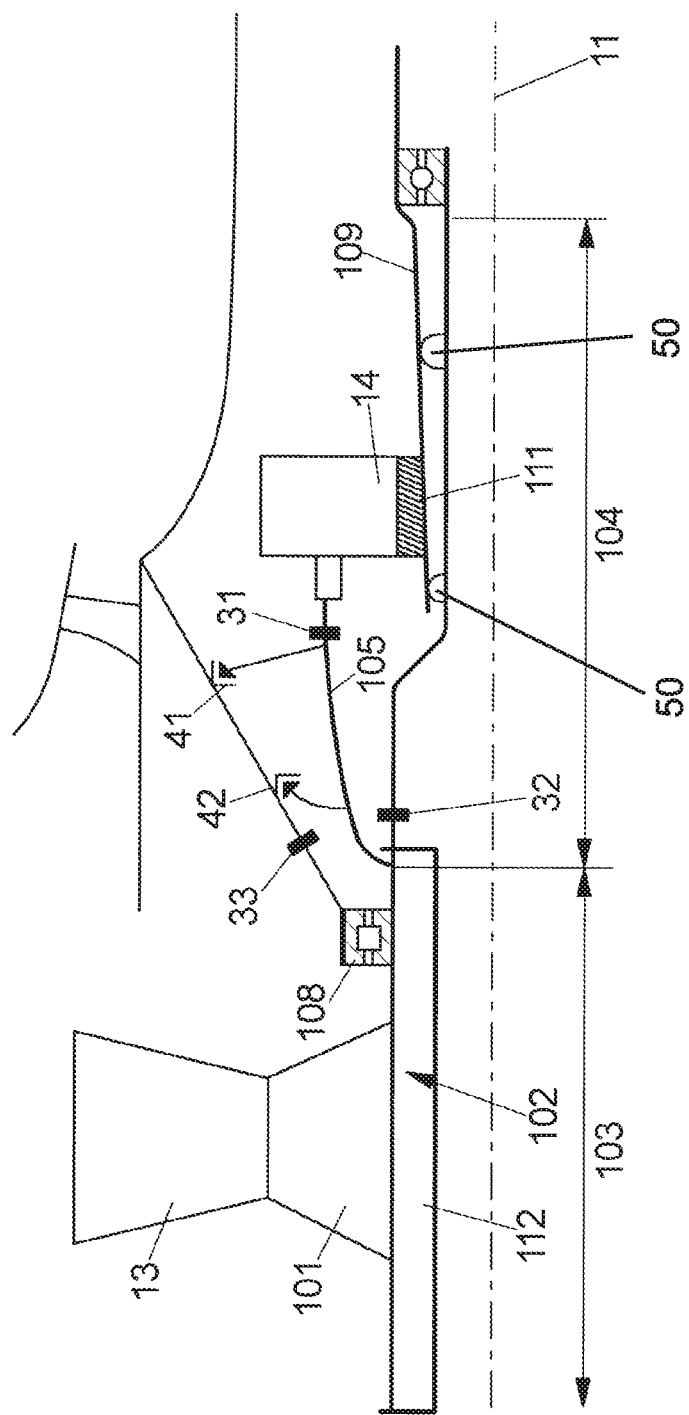
FIG. 3 shows a cross-sectional view of a second embodiment of a gas turbine engine.

In FIGS. 2 and 3 (only one blade partly shown in FIGS. 2 and 3) the propulsive fan 13 is connected to the output of the gearbox 14 via a shaft 102, the shaft 102 being a part of the drive part assembly.

The shaft 102 comprises several parts, in particular a fan shaft 103 and a thrust shaft 104. Furthermore, a torque bearing coupling 105—also being a part of the shaft 102—is connecting the shaft 102 with the gearbox 14 at the junction between the fan shaft 103 and the thrust shaft 104.

The gearbox 14 is only shown schematically in FIGS. 2 and 3 with a sun gear 111 around the thrust shaft 104.

Under nominal operation the thrust shaft 104 as a part of the shaft 102 does not carry torque, just bending moments and thrust loads. Under nominal operation thrust loads and bending moments are carried by the fan shaft 103, the thrust shaft 104, an intershaft bearing 106 eventually to a pylon (not shown in the figures) of the gas turbine engine 10.

The torque load is transmitted from the gearbox 14 via the dome-shaped torque bearing coupling 105 to the fan shaft 103 to the fan disk 101 and the fan 13. Therefore, the drive train from gearbox 14 towards the front of the gas turbine engine 10 comprises the torque bearing coupling 105, the fan shaft 103 and the fan disk 101. In other embodiments, the torque bearing coupling 105 can have a different shape than the one shown here.

A front bearing cone 107 encloses in particular the gearbox 14 and the toque bearing coupling 105.

The first mechanical fuse 31 is positioned in or on the torque bearing coupling 105. This means that it is positioned in a torque carrying part.

The second mechanical fuse 32 is positioned axially just in front of the gearbox 14 in or on the thrust shaft 104. As mentioned above, the thrust shaft 104 is a non-torque carrying part of the shaft 102. In general, the second mechanical fuse is positioned in a non-torque carrying shaft or a non-torque carrying part of the shaft 102, in particular the thrust shaft 104.

The third mechanical fuse 33 is positioned in or on the front bearing cone 107, in particular axially behind a first bearing 108.

A breaking of the first and second fuses 31, 32 disengages the fan 13 from the gearbox 14 by severing the connections with the torque bearing coupling 105 and the thrust shaft 104. Therefore, the load due to the failure can be bypassed to other structural parts of the gas turbine engine.

The breaking of the third fuse 33 protects e.g. the engine structure on the gearbox 14.

In the embodiments shown in FIGS. 2 and 3, three mechanical fuses 31, 32, 33, i.e. sections in a material which are designed to break under a defined load (torque and/or force, see FIGS. 4 and 5), are used.

In any case, the material of the torque bearing coupling 105, the thrust shaft 104 and/or the front bearing cone 107 is locally deliberately thinned and/or structured at the mechanical fuses 31, 32, 33 to allow a defined breaking under a defined load.

Furthermore, FIGS. 2 and 3 show a fan catcher 112 which provides a secondary load path between the propulsive fan 13 and the thrust shaft 104. This provides a retention of the propulsive fan 13 in the event that the fan shaft 102 should fail.

It should be noted that not all embodiments require to have all three mechanical fuses 31, 32, 33. Also, the locations of the mechanical fuses 31, 32, 33 might vary due to the application in the gas turbine engine 10.

In FIG. 3, two load stops 41, 42 are schematically shown in addition to the mechanical fuses 31, 32, 33. Regarding the mechanical fuses 31, 32, 33 reference can be made to FIG. 2.

The first load stop 41 comprises an angled structure (one arm pointing in axial direction backwards, one arm pointing radially inwards) mounted or integral with the front bearing cone 107. Radially inwards a matching structure (one arm pointing in axial direction backwards, one arm pointing radially inwards) is mounted or integral with the torque bearing coupling 105.

If the first and second mechanical fuses 31, 32 are broken, the torque bearing coupling 105—together with the fan shaft 103 and the fan 13—will experience some radial movement. The angled structure of the first load stop 41 controls the radial and axial movement of those parts because of a form-locking effect when the two parts of the angled structures 41 are moved together after the mechanical failure.

The second load stop 42 also comprises an angled structure. The one part mounted or integral with the front bearing cone 107 has one arm pointing in the axial forward position, one arm pointing in the radial inward direction. The matching structure to this part is mounted or integral with the torque bearing coupling 105. This second load stop 42 can take an axial load during windmilling situation after the fan 13 has been disengaged from the gearbox 14.

In the embodiment shown in FIG. 3, the thrust shaft 104 is contacting guiding means 50 to allow rotation under thrust shaft deflection. The guiding means 50 are e.g. local protrusions or ring-like structures.

In the following, different failure modes are described in particular with reference to FIGS. 2 and 3. It should be noted that FIGS. 2 and 3 show a number of features which do not have to be present all at the same time.

1. The first failure mode is a failure of the thrust shaft 104 behind the fan catcher 112. This failure breaks the rear load path which is carrying fan thrust loads and bending moments. If this failure would not be mitigated this would lead to a damage of the gearbox 14 due to additional loads on the torque path and loss of the fan 13 from the gas turbine engine 10.

In the following, two mitigation options are described.

In the first option, the axial load—which can no longer be carried by the thrust shaft 104—runs through the torque bearing coupling 105 and causes a breaking in the first mechanical fuse 31. The first mechanical fuse 31 comprises a defined thinning of the material. Alternatively a spline connection can be used which is subsequently pulled apart due to the propulsive fan 13 thrust loads in axial direction.

In the second option, the increased load causes a seizure of the gearbox 14 which causes a defined breaking of the first mechanical fuse 31, so that the fan 13 can continue to rotate.

After failure of the thrust shaft 104 and the controlled disconnection through the controlled failure of the first mechanical fuse 31, the fan 13 will be in windmilling mode with an axial load in the reverse direction.

The second load stop 42—here a snubber—carries the load produced by the windmilling fan 13.

2. The second failure mode is a failure (seizure) of the intershaft bearing 106 resulting in a coupling of the input and output speeds of the gearbox 14 or a failure of a component between the fan shaft 103 and an intermediate pressure shaft 109. In either case the system is subjected to an increased torque.

In one embodiment, a second mechanical fuse 32 is present in the thrust shaft 104 itself, e.g. by a deliberate thinning of the shaft material which breaks in a defined way under a defined high torque event.

After the breaking of this second mechanical fuse 32 the gearbox 14 will continue to rotate. The axial load will go through the torque bearing coupling 105 instead of the thrust shaft 104 resulting in a defined activation of the first mechanical fuse 31.

As in the first failure mode, after breaking the mechanical fuses 31, 32 the axial thrust goes through the torque bearing coupling 105 and the first load stop 41 (snubber/dry bearing) into the front bearing cone 107. As a result, the thrust shaft 104 stops rotating.

The gearbox 14 and the rotor of the intermediate pressure compressor 15 are free of the load from the fan 13. This results in an overspeed which is detected e.g. by the normal sensors of detecting too fast shaft rotations resulting in an engine shutdown.

As described in the context of the first failure mode, the fan 13 starts windmilling with an axial load in reverse direction which is supported by the second load stop 41.

3. The third failure mode relates to a gear seizure in the gearbox 14. This will lead to a stopping of the fan 13 with an increasing powerplant drag.

The rotational momentum of the fan causes a torque spike which will deliberately break the first mechanical fuse 31 in the torque bearing coupling 105.

4. The fourth failure mode relates to a fan lock. During this event the first mechanical fuse 31 in the torque bearing coupling 105 will break depending on the rotational momentum of the gearbox 14, the intermediate pressure compressor 15 and the intermediate pressure turbine 19.

5. The fifth failure mode relates to a fan blade off scenario under which high lateral loads could be transmitted through the first bearing 108 into the front bearing cone 107, through the fan shaft 103 into the gearbox 14 and through the thrust shaft 104 to the intershaft bearing 106 and beyond.

The thrust shaft 104 deflection under this scenario could cause clashing with the sun gear 111 of the gearbox 14, leading to sparks, oil fire and failure of the central shaft. The loads may also damage the gearbox 14 and preventing the fan 13 from windmilling.

The first mechanical fuse 31 at the torque bearing coupling 105 could be used to break under a fan blade off condition. The increased out-of-balance loads could be sufficient to break it, especially if the front bearing cone 107 is fused as well. This would not mitigate the thrust shaft 104 clashing risk.

However, if the thrust shaft 104 fails due to the clashing then the fan 13 will be supported by the second load stop 42. The main issue is that the drive train has been disconnected (i.e. a disconnected torque path) so the gas turbine engine 10 will not run on in a failed state.

The increased thrust shaft 104 loads could also cause seizure of the intershaft bearing 106 or an intermediate pressure thrust bearing.

An increased gearbox 14 load could also lead to a seizure of the gearbox 14 and break the first mechanical fuse 31.

In some of the failure scenarios windmilling and an axial load reversal will occur. There are two windmilling states:

a) Two mechanical fuses 31, 32 are broken. In this case, the fan 13 is no longer pulling on the fan shaft 103 and the torque bearing coupling 105. The load stops 41, 42 are required to prevent the fan 13 moving aft and tangling with the torque carrier and/or thrust shaft 104.

b) If only the first mechanical fuse 31 is broken, the thrust shaft 104 carries the axial load during windmill.

It should be considered that the mechanical fuses 31, 32 should be sufficiently strong under a bird strike. The fusing loads (i.e. the threshold for deliberate failure of the mechanical fuses 31, 32) need to be sufficiently high for the other failure modes that the mechanical fuses 31, 32 do not break under a bird strike alone. The gas turbine engine 10 needs to be able to run on partial power.

Figure 4:
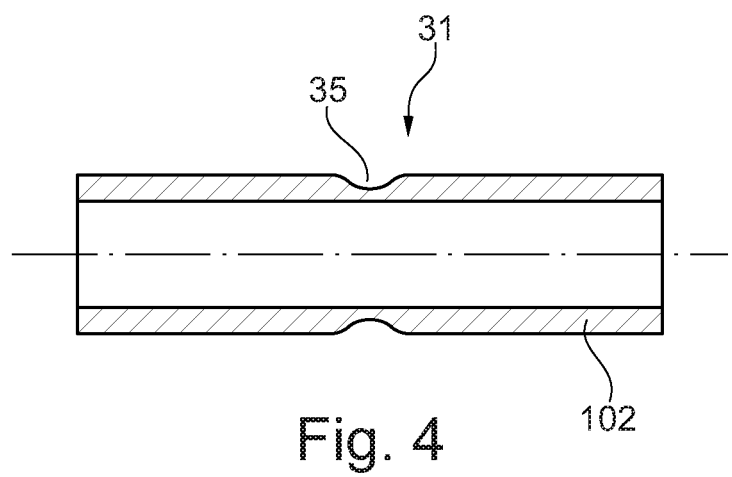
FIG. 4 shows a cross-sectional view of first embodiment of a mechanical fuse in a shaft.
Figure 5:
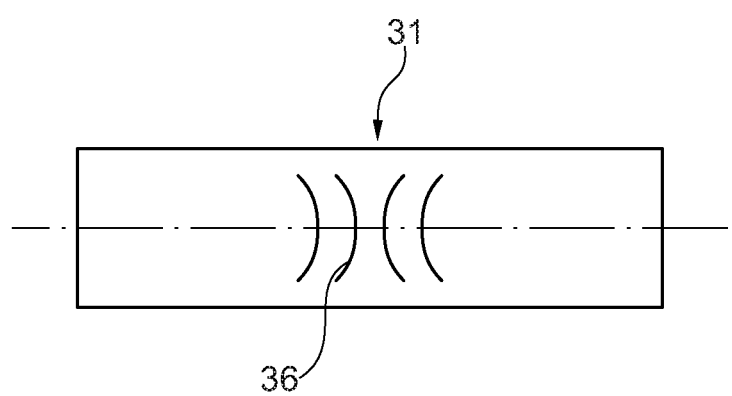
FIG. 5 shows a view of a second embodiment of a mechanical fuse in a shaft.

In FIGS. 4 and 5, two different embodiments for a mechanical fuse 31 are shown. FIG. 4 shows a sectional view of a shaft, e.g. the thrust shaft 104. Circumferentially, a section 35 of the shaft 104 is deliberately thinned. The material strength in this section 35 is so designed that under nominal loads the thrust shaft 104 is operating properly within its design limits. If e.g. a torque exceeds a certain threshold value, the thrust shaft 104 breaks intentionally in the thinned section 35. A similar design is also possible in parts which are not shaft, e.g. a conical casing or a flat material. The same principle also applies to force loads or combined torque and force loads.

FIG. 5 shows a mechanical fuse 31 which comprises an engraved structure 36 in a material which operates analogue to the thinned section described in connection with FIG. 4.

The shown designs of the mechanical fuse 31 in FIGS. 4 and 5 are also applicable to the mechanical fuses 32, 33 in the thrust shaft 104 and/or the front bearing cone 107.

LIST OF REFERENCE NUMBERS 10 gas turbine engine
11 principal rotational axis 12 air intake
13 propulsive fan
14 gearbox, power gearbox
15 intermediate pressure compressor
16 high-pressure compressor
17 combustion equipment
18 high-pressure turbine
19 intermediate-pressure turbine
20 exhaust nozzle
21 fan casing
22 by-pass duct
31 first mechanical fuse
32 second mechanical fuse
33 third mechanical fuse
35 thinning in a material for a mechanical fuse
36 structuring in a material for a mechanical fuse
41 first load stop
42 second load stop
50 guiding means (bumpers)
101 fan disk
102 shaft
103 fan shaft
104 thrust shaft
105 torque bearing coupling of gearbox to shaft
106 intershaft bearing
107 front bearing cone
108 first bearing
109 intermediate pressure shaft
111 sun gear of power gearbox
112 fan catcher

The invention claimed is:

1. A gas turbine engine with a geared turbofan arrangement with a gearbox in a drive shaft assembly driven by a turbine,
the drive shaft assembly comprising a shaft connecting a propulsive fan to a driving side of the gearbox, the shaft comprising:
a torque bearing portion including a fan shaft and a torque bearing coupling,
a thrust shaft, the thrust shaft being connected to the fan shaft,
wherein the torque bearing coupling connects the fan shaft with the driving side of the gearbox at a junction of the fan shaft and the thrust shaft,
at least one mechanical fuse in the drive shaft assembly enabling a controlled disengagement of at least one engine part from the drive shaft assembly in case of a mechanical failure of the gas turbine engine or a part thereof,
at least one load stop for bearing a load and for retaining the at least one propulsive fan in the gas turbine engine in the case of the mechanical failure of the gas turbine or the part thereof, the at least one load stop operatively positioned between the driving side of the gearbox and the propulsive fan,
wherein the at least one mechanical fuse includes a first mechanical fuse positioned in at least one chosen from the fan shaft and the torque bearing coupling.

2. The gas turbine engine according to claim 1, wherein the at least one mechanical fuse comprises at least one chosen from a defined thinning, a structuring of a load bearing material, and a structure with a defined deformable zone.

3. The gas turbine engine according to claim 1, wherein the first mechanical fuse comprises a spline joint.

4. The gas turbine engine according to claim 1, wherein the thrust shaft forms at least part of a non-torque bearing portion of the shaft, and the at least one mechanical fuse includes a second mechanical fuse positioned in the thrust shaft.

5. The gas turbine engine according to claim 4, wherein the at least one mechanical fuse includes a third mechanical fuse positioned in a front bearing cone.

6. The gas turbine engine according to claim 1, wherein the at least one load stop is positioned to engage a moving part of the gas turbine engine after the mechanical failure.

7. The gas turbine engine according to claim 1, wherein the at least one load stop is configured for directing loads away from the gearbox.

8. The gas turbine engine according to claim 1, and further comprising a guiding surface at least one chosen from 1) attached to the thrust shaft and engaging other structure of the engine and 2) engaging the thrust shaft, to allow rotation of the thrust shaft under thrust shaft deflection.

9. The gas turbine engine according to claim 1, and further comprising a reference shaft for detection of a break in the shaft.

10. The gas turbine engine according to claim 5, wherein the third mechanical fuse is positioned in a front bearing cone axially behind a first bearing.

* * * * *